United States Patent Office 2,718,887
Patented Sept. 27, 1955

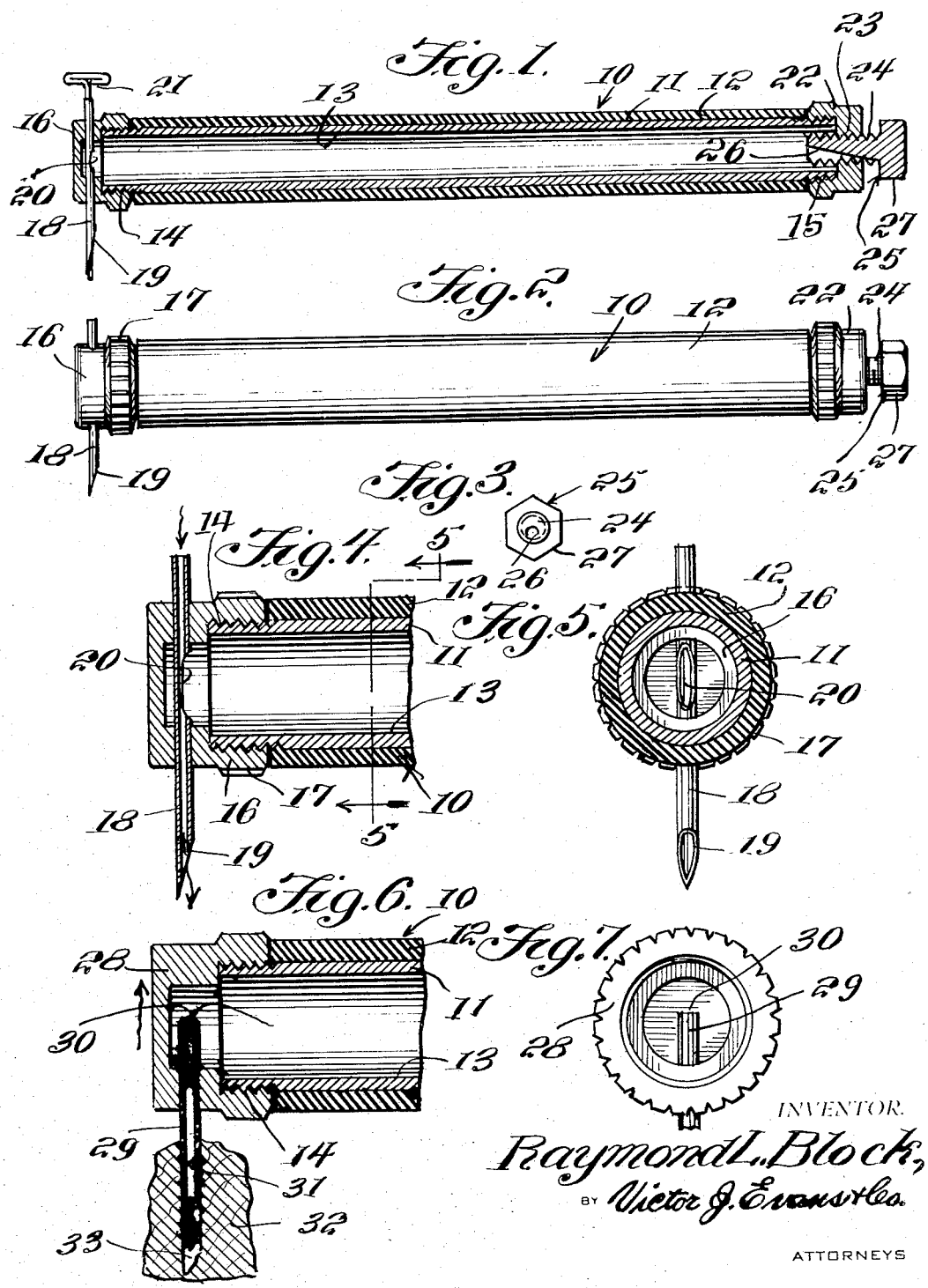

2,718,887

POULTRY VACCINATOR

Raymond L. Block, Lakewood, N. J.

Application December 18, 1953, Serial No. 398,907

2 Claims. (Cl. 128—253)

This invention relates to a vaccinating instrument, and more particularly to an instrument for use in vaccinating chickens and the like.

The object of the invention is to provide a vaccinator which is adapted to be used to vaccinate growing chickens and the like, the vaccinator including a reservoir from which vaccine is dispensed in predetermined quantities.

Another object of the invention is to provide a vaccinating instrument which is adapted to dispense a measured quantity of vaccine for application in a chicken or similar bird.

A further object of the invention is to provide a vaccinating instrument which is extremely simple and inexpensive to manufacture.

Other objects and advantages will be apparent during the course of the following description.

In the accompanying drawings forming a part of this application, and in which like numerals are used to designate like parts throughout the same;

Figure 1 is a longitudinal sectional view through the vaccinating instrument according to the present invention;

Figure 2 is a side elevational view of the vaccinating instrument, with the plunger pin removed therefrom;

Figure 3 is an end elevational view of the air vent screw;

Figure 4 is a fragmentary enlarged longitudinal sectional view showing the dispensing end of the vaccinating instrument;

Figure 5 is a sectional view taken on the line 5—5 of Figure 4;

Figure 6 is an enlarged fragmentary longitudinal sectional view of a modified vaccinating instrument;

Figure 7 is an elevational view of the cap for the device of Figure 6.

Referring in detail to Figures 1 through 5 of the drawings, there is shown a vaccinating instrument which includes a cylindrical barrel 10. The barrel 10 includes a cylindrical hollow open-ended casing 11 which is provided with a reservoir 13 therein for holding fluid vaccine. Arranged in embracing relation with respect to the casing 10 is a cylindrical housing 12 which may be fabricated of any suitable material.

One end of the casing 11 is threaded exteriorly, as at 14, while the other end of the casing 11 is also threaded exteriorly, as at 15, Figure 1.

Arranged in threaded engagement with the end 14 of the casing 11 is a cap 16, the cap 16 being knurled exteriorly, as at 17, in order to facilitate the manual removal and replacement of the cap 16 on the end 14. The cap 16 carries a hollow open-ended scarifying needle 18 therein, the needle 18 being provided with a tapered tip 19. The needle 18 is provided with an opening 20 intermediate its ends, and the fluid vaccine from the reservoir 13 is adapted to flow through the opening 20 and out through the tapered tip 19 of the needle 18. A plunger pin 21, Figure 1, is slidably arranged in the needle 18, and the plunger pin 21 can be manually reciprocated in the needle 18 to insure a proper flow of vaccine therethrough. Further, the plunger pin 21 serves to prevent dirt or other contamination from blocking the hollow needle 18.

Arranged in threaded engagement with the other threaded end 15 of the casing 11 is a knurled stopper 22 which is provided with a central threaded bore 23. A thumb screw 25 has an exteriorly threaded shank 24 arranged in threaded engagement with the bore 23. The shank 24 is provided with a tapered slot 26 which is adapted to be used for venting air into the interior of the reservoir 13 in order to insure that the fluid vaccine flows properly out of the needle 18. A head 27 is formed on one end of the thumb screw 25, and the head 27 is adapted to be gripped within the user's hand for rotating the thumb screw 25.

Referring to Figures 6 and 7, there is shown a slightly modified vaccinating instrument. The instrument shown in Figures 6 and 7 is operated and has the approximately same construction as the instrument shown in Figures 1 through 5. However, in the device shown in Figures 6 and 7, the vaccinating instrument has a cap 28 which carries an open-ended hollow needle 29 therein. The cap 28 is arranged in threaded engagement with the end 14 of the casing 11, and the needle 29 has its upper end 30 open for communicating with the interior of the reservoir 13. A passageway 31 extends longitudinally through the needle 29 whereby the fluid vaccine can pass through the needle 29 and into an incision 33 in the chicken 32.

From the foregoing, it is apparent that a vaccinating instrument has been provided which is extremely useful in vaccinating chickens or other similar birds. When using the device shown in Figures 1 through 5, the stopper 22 can be manually removed from the casing 11, whereupon a measured quantity of fluid vaccine can be poured or placed in the reservoir 13. The tapered or pointed end 19 of the scarifying needle 18 is then inserted into the chicken to be vaccinated and by raising the rear end of the instrument, the fluid vaccine will flow from the reservoir 13 through the opening 20 and out through the end 19 of the needle 18 into the chicken. The thumb screw 25 can be set so that air enters the reservoir 13 through the slot 26, and by properly positioning the thumb screw 25, the rate of flow of vaccine through the needle 18 can be regulated. Further, the plunger pin 21 can be reciprocated in the needle 18 to insure proper passage of the fluid through the needle 18.

In the embodiment shown in Figures 6 and 7, the fluid is adapted to be withdrawn from the reservoir 13 up through the needle 29 by suction. Thus, the needle 29 is inserted into the chicken and upon withdrawal of the needle 29 from the chicken being vaccinated, a sufficient quantity of vacinating fluid will be withdrawn through the needle 29 by suction.

By using the vaccinating instrument of the present invention, the uncertainties of vaccination will be eliminated. The vaccinating operation can be accomplished with a minimum amount of effort on the part of the operator. The chicken is preferably vaccinated in a cleared area in the web of the wings. Further, the device of the present invention can be readily cleaned when desired.

I claim:

1. In a vaccinating instrument, a hollow barrel including a cylindrical casing defining a reservoir for holding fluid vaccine therein, the opposite ends of said casing being threaded exteriorly for a portion of its length, a cylindrical housing aranged in embracing relation with respect to said casing and secured thereto, a cap arranged in threaded engagement with an end of said casing and closing an end of the latter, a hollow needle carried by said cap for scarifying a chicken, there being an opening in said needle intermediate the ends thereof for the ingress therethrough of fluid from said casing, a plunger pin slidably arranged in said needle, a stopper arranged in threaded engagement with the other end of said casing, there being a threaded bore arranged in said stopper, and a thumb screw arranged in engagement with said bore and having a tapered slot therein for venting air into said casing, said cap and stopper being knurled exteriorly for a portion of its length.

2. In a vaccinating instrument, a hollow barrel closed at its ends for holding vaccine, a hollow needle carried by and extending diametrically from one end of the barrel and communicating with the interior of the barrel, and barrel venting means at the other end of said barrel to regulate the flow of vaccine from the needle, said barrel venting means comprises a thumb screw extending axially through and screw threadedly engaged with said other end of the barrel, said screw having in a side thereof a groove to provide a vent opening in an adjusted position of the screw, the groove increasing in depth in the direction at the inner end of said screw, whereby to enable the effective size of the vent opening to be regulated and controlled.

References Cited in the file of this patent

UNITED STATES PATENTS

| | | |
|---|---|---|
| 2,437,920 | Overton | Mar. 16, 1948 |
| 2,445,010 | Thompson | July 13, 1948 |
| 2,512,882 | Truesdale | June 27, 1950 |